(12) United States Patent
Claflin et al.

(10) Patent No.: US 7,500,430 B2
(45) Date of Patent: Mar. 10, 2009

(54) VACUUM TRASH COMPACTOR APPARATUS

(75) Inventors: Shawn A. Claflin, Everett, WA (US); Steven H. Sauer, Seattle, WA (US); Thomas L. LeBlanc, Mukilteo, WA (US); Vicki A. Curtis, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 11/463,749

(22) Filed: Aug. 10, 2006

(65) Prior Publication Data
US 2008/0034987 A1 Feb. 14, 2008

(51) Int. Cl.
*B30B 9/04* (2006.01)
*B30B 15/06* (2006.01)

(52) U.S. Cl. .......... 100/90; 100/100; 100/137; 100/178; 100/229 A; 100/245; 100/247; 100/269.01; 100/295; 220/908

(58) Field of Classification Search .......... 100/90, 100/100, 127, 190, 215, 229 A, 240, 245, 100/265, 269.01, 295, 902, 137, 177, 178, 100/246, 247, 248; 220/908; 244/1 R, 129.1
See application file for complete search history.

(56) References Cited

U.S. PATENT DOCUMENTS

| 4,444,099 | A | * | 4/1984 | Paleschuck | .......... 100/127 |
|---|---|---|---|---|---|
| 4,680,808 | A | | 7/1987 | Paleschuck | |
| 5,263,412 | A | | 11/1993 | Chenard et al. | |
| 5,465,660 | A | | 11/1995 | Conti et al. | |
| 5,490,455 | A | | 2/1996 | Conti et al. | |
| 5,588,617 | A | | 12/1996 | Bliss | |
| 6,012,678 | A | | 1/2000 | Hale | |
| 6,070,522 | A | | 6/2000 | Koljonen | |
| 6,308,618 | B1 | | 10/2001 | Wagner | |
| 6,453,481 | B1 | | 9/2002 | Pondelick | |
| 6,640,701 | B2 | * | 11/2003 | Hoffjann et al. | .......... 100/110 |
| 6,684,764 | B2 | | 2/2004 | Sebright | |
| 6,994,022 | B2 | | 2/2006 | Paleschuck | |
| 2003/0136279 | A1 | * | 7/2003 | Tarlow | .......... 100/90 |

FOREIGN PATENT DOCUMENTS

| EP | 0349016 | 7/1985 |
|---|---|---|
| EP | 0268709 | 11/1986 |
| EP | 0322492 B1 | 5/1989 |

* cited by examiner

*Primary Examiner*—Jimmy T Nguyen
(74) *Attorney, Agent, or Firm*—Evan Law Group LLC (57) ABSTRACT

The invention discloses differing embodiments of trash management systems and methods for the disposal and/or collection of trash. In one embodiment under the invention, a trash management system may include a mobile cart, a trash vessel connected to the cart, a piston adapted to compact trash within the trash vessel, and a passageway adapted to be connected to a vacuum trash disposal. The piston may be adapted to travel from one position to a second position, and back from the second position to the first position. This movement of the piston may be achieved utilizing multiple passageways which are each adapted to be connected to a vacuum source and a vent source.

29 Claims, 8 Drawing Sheets

VACUUM TRASH COMPACTOR APPARATUS

BACKGROUND OF THE INVENTION

There are existing systems and methods for the disposal and/or collection of trash. Some of these systems and methods do not allow for the mobile collection of trash. Some other of these systems and methods do not allow for various types of trash to be collected in differing vessels. Still other of these systems and methods do not allow for trash collection without the use of trash bags. Some of these systems and methods do not allow for the compaction of trash. Still other of these systems and methods do not allow for the vacuum disposal of trash.

A system and method is needed which may solve one or more problems in one or more of the existing systems and/or methods for the disposal and/or collection of trash.

SUMMARY OF THE INVENTION

In one aspect of the invention, an aircraft trash management system may be provided. The system may include a mobile cart and at least one trash vessel connected to the mobile cart. At least one piston may be moveable from a first position to a second position, and may be moveable from the second position back to the first position. The piston may be adapted to compact trash within the trash vessel. At least one passageway may be connected to the trash vessel. The passageway may be adapted to be connected to a vacuum trash disposal.

In another aspect of the invention, a trash management system may be provided. The system may include a mobile cart, and at least one removable trash vessel connected to the mobile cart. At least one piston may be moveable from a first position to a second position, and may be moveable from its second position back to its first position. The piston may be adapted to compact trash within the removable trash vessel. A first passageway may be connected to the trash vessel. The system may also include a second passageway. Each of the first and second passageways may be adapted to be connected to a vacuum trash disposal and to a vent source.

In a further aspect of the invention, a method of trash collection in an aircraft may be provided. The method may include the step of disposing of trash into at least one vessel in a mobile cart. In another step, the trash may be compacted in the vessel. In yet another step, at least a portion of the trash may be vacuumed out of the vessel.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
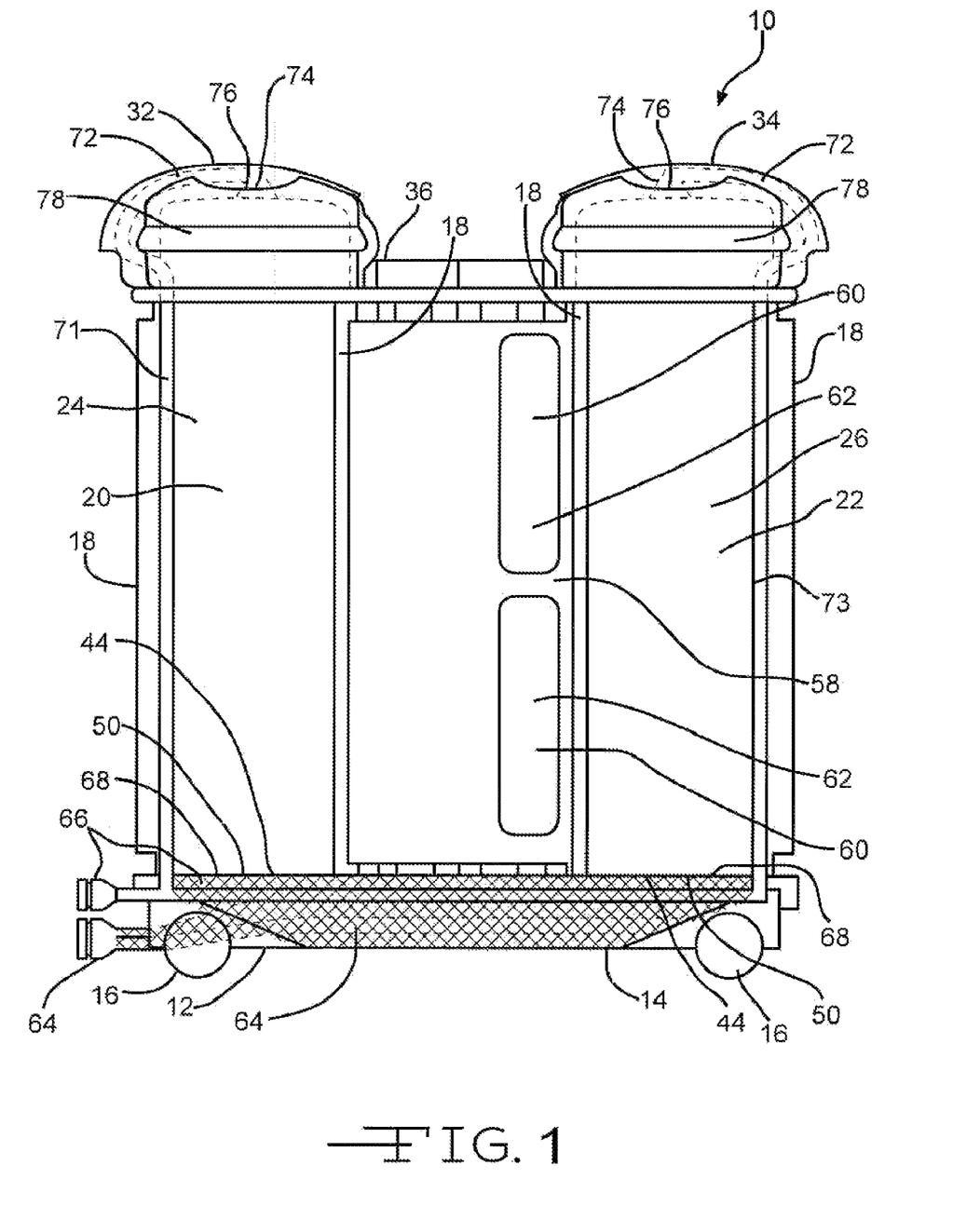
FIG. 1 depicts a side view of one embodiment of a trash management system under the invention.

In one embodiment of the invention, as shown in FIG. 1, a trash management system 10 may be provided. The trash management system 10 may be adapted to be utilized in an aircraft, or in other non-aeronautical applications. The trash management system 10 may include a mobile cart 12. The mobile cart 12 may include a bottom basin 14, a multitude of multi-direction wheels 16 attached to the bottom basin 14, and a plurality of spaced-apart curved wall surfaces 18 extending vertically upward from the basin 14. The curved wall surfaces 18 may be adapted to hold removable cylindrical trash vessels 20 and 22, each which may be held in place between a plurality of the spaced-apart curved wall surfaces 18. Trash vessels 20 and 22 may each be made of metal or plastic, and may be adapted to dispose of trash without the use of trash bags.

Each of the trash vessels 20 and 22 may comprise cylindrical outer surfaces 24 and 26 having respective hollow, interior compartments (not shown) adapted to hold trash. One of the trash vessels 20 may be adapted to dispose recyclable trash, and the other of the trash vessels 22 may be adapted to dispose non-recyclable trash. In other embodiments, any number of trash vessels of different types and configurations may be utilized to dispose of varying types of trash.

Figure 2:
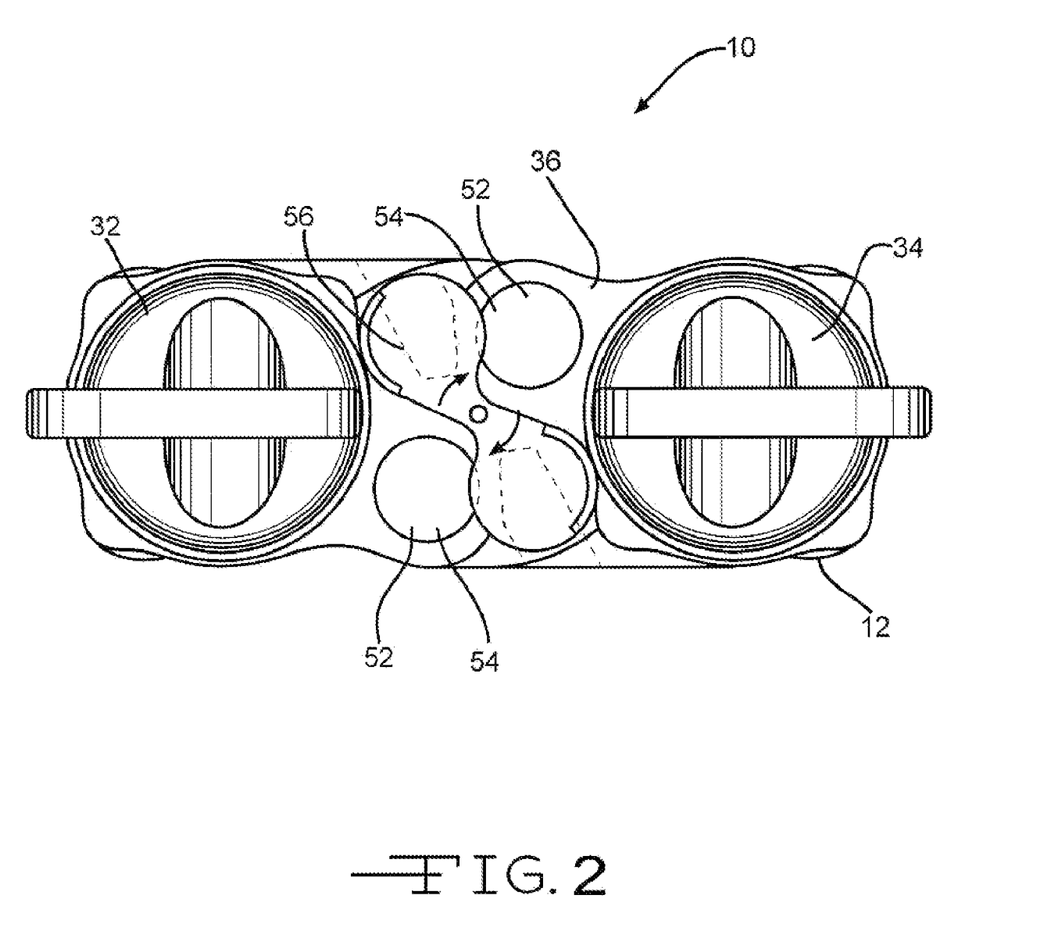
FIG. 2 depicts a top view of the trash management system of FIG. 1.

As shown in FIGS. 1 and 2, two moveable lids 32 and 34 may be attached to a top surface 36 of the cart 12. When closed, the lids 32 and 34 may cover openings (not shown) in top surface 36, into which the removable trash vessels 20 and 22 may be inserted, in order to cover trash vessels 20 and 22. The lids 32 and 34 may be adapted to rotate and swivel with respect to top surface 36 allowing the lids 32 and 34 to open, close, and swivel into different orientations. In such manner, the lids 32 and 34 may allow for the disposal and storage of trash within the vessels 20 and 22, and may also allow for the insertion and removable of trash vessels 20 and 22 into the openings in top surface 36 of the cart 12.

Figure 3:
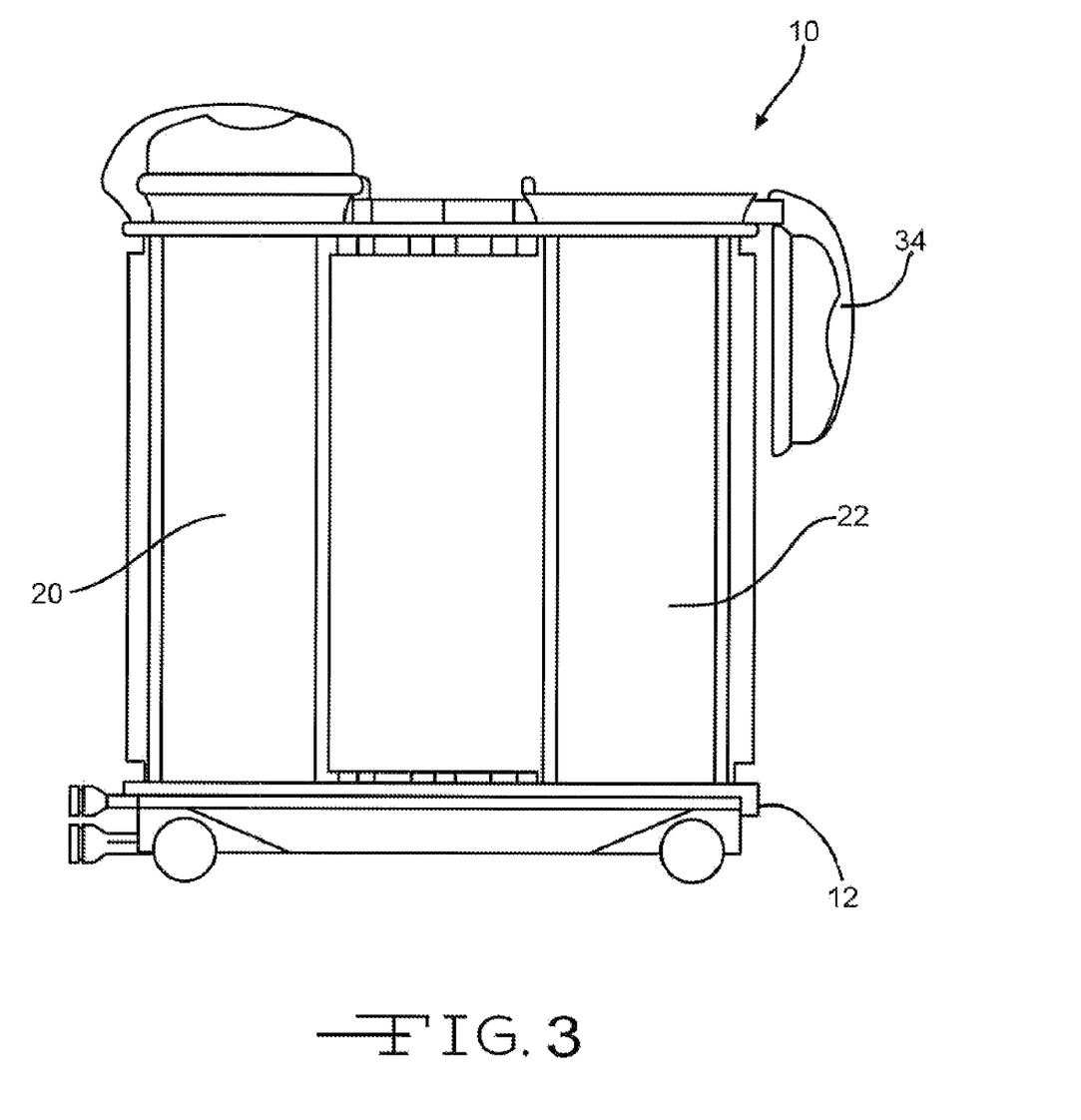
FIG. 3 depicts a side view of the trash management system of FIG. 1 with a lid rotated and swiveled out of place to expose a trash vessel.
Figure 4:
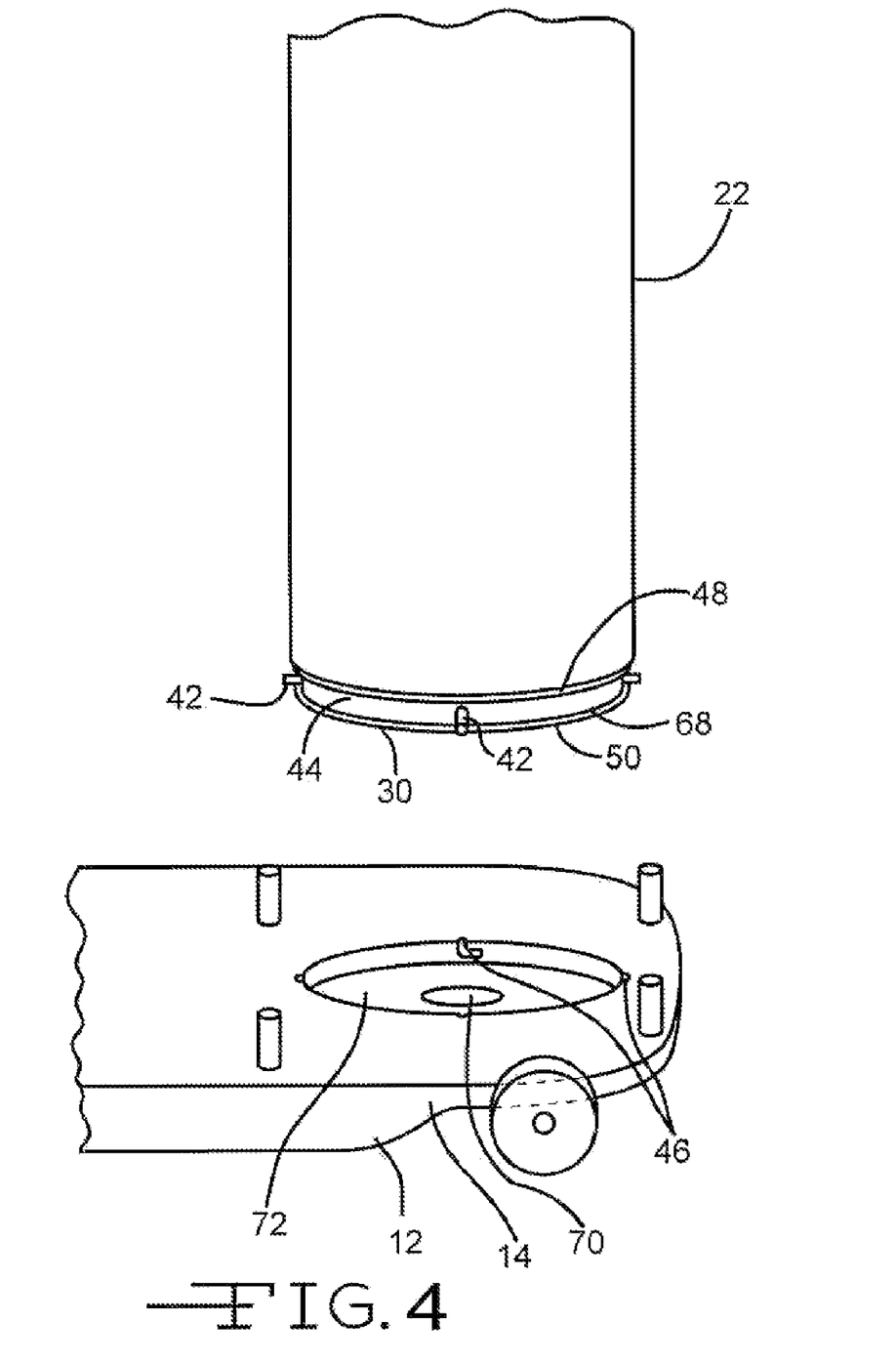
FIG. 4 depicts a partial, cut-away, perspective view of a bottom portion of a trash vessel of the system of FIG. 1 in order to illustrate how the trash vessel may be connected to the system.

In order to remove trash vessel 22 from cart 12, lid 34 may be rotated and swiveled from its position show in FIG. 1 to its position shown in FIG. 3. As shown in FIG. 4, trash vessel 22 may then be rotated and lifted upwardly with respect to basin 14 of cart 12 in order to remove pins 42 attached to a bottom portion 44 of the trash vessel 22 from slots 46 in the basin 14. In such manner, the trash vessel 22 may be unlocked from its locked position against the basin 14. It should be noted that an o-ring seal 48 at a bottom portion 44 of the trash vessel 22 may be adapted to substantially prevent leaking when the trash vessel 22 is locked in place against the basin 14.

Figure 5:
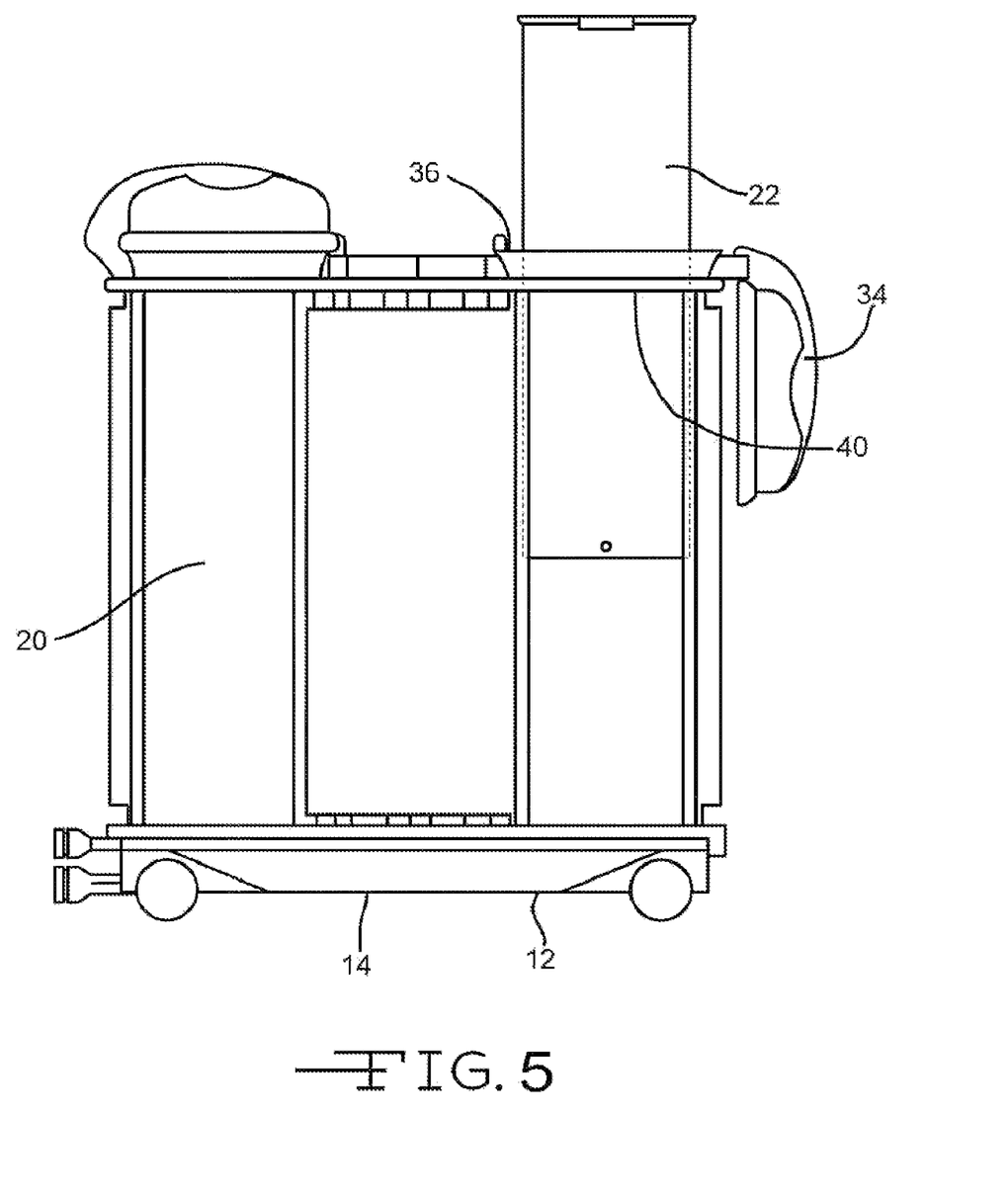
FIG. 5 depicts a side view of the trash management system of FIG. 3 with the trash vessel being slid out of the system.
Figure 6:
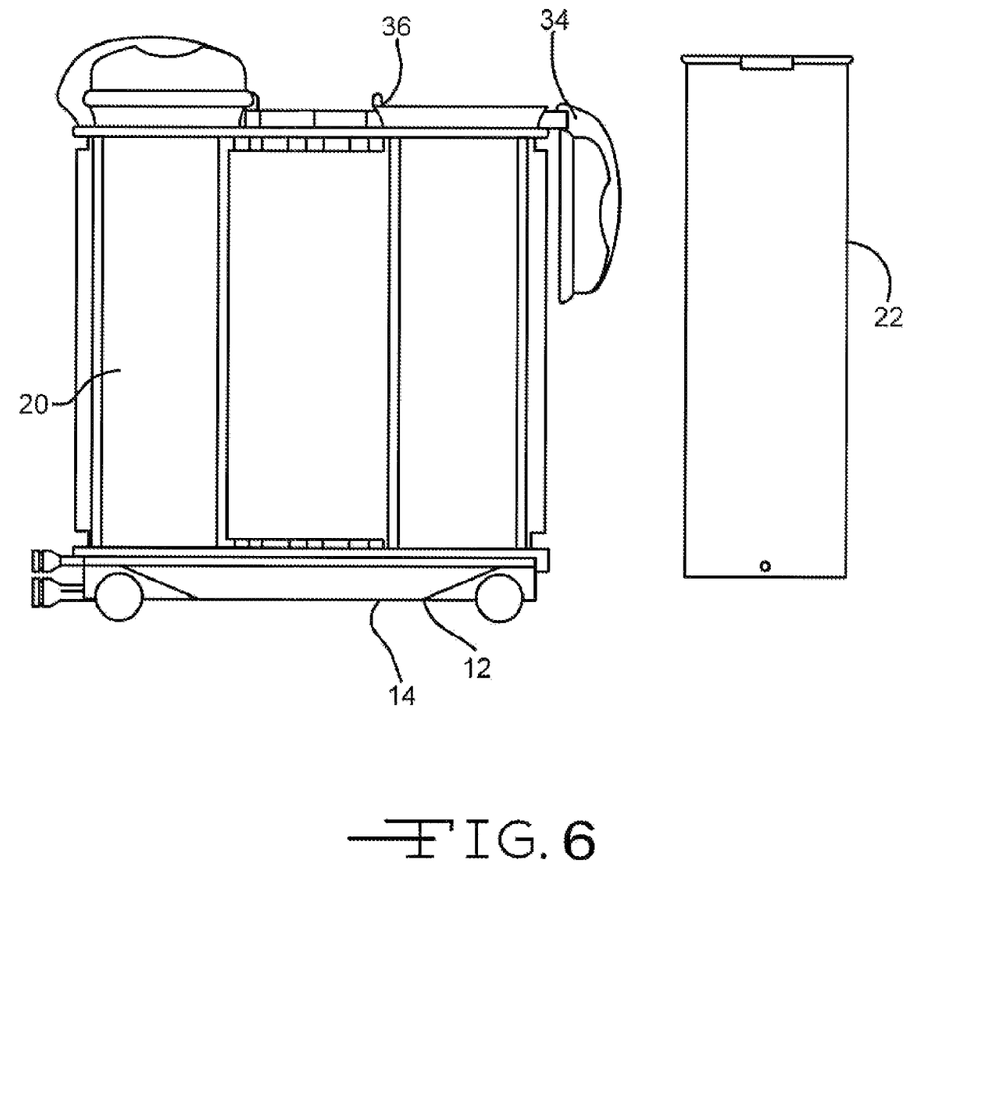
FIG. 6 depicts a side view of the trash management system of FIG. 5 with the trash vessel completely removed from the system.

As shown in FIG. 5, after the trash vessel 22 is unlocked from basin 14, the trash vessel 22 may be lifted upwardly through opening 40 in top surface 36 of cart 12. After clearing the top surface 36 of the cart 12, the trash vessel 22 may be removed from the cart 12 as shown in FIG. 6. This same process may be used to remove trash vessel 20 from cart 12.

As shown in FIG. 4, which depicts a partial, cut-away, perspective view of a bottom portion 44 of trash vessel 22 in a raised position over basin 14, a tear-off seal 50 may cover the bottom portion 44 of trash vessel 22. The tear-off seal 50 may cover the bottom of the vessel's interior compartment 30 and may be glued to the bottom portion 44 of trash vessel 22. When trash vessel 22 is removed from cart 12, the tear-off seal 50 may allow the disposal of trash into trash vessel 22 without trash falling through the bottom portion 44 of trash vessel 22. Another tear-off seal having the same function may cover the bottom portion of trash vessel 20. The tear-off seal 50 may be adapted to be removed during a trash compaction and/or a trash vacuum cycle.

As best shown in FIG. 2, additional openings 52 may be disposed in top surface 36 of cart 12. A plurality of removable containers 54 may be disposed within the openings 52. The removable containers 54 may be substantially cylindrical with hollow interiors for the storage of trash. The removable containers 54 may be adapted to dispose of cups or other types of trash. A rotate-able cover 56 may be attached to the top surface 36 of cart 12. The cover 56 may be adapted to rotate into a closed position covering the openings 52, or into an open position allowing the openings 52 to be exposed so that trash may be disposed of within the containers 54. To remove the containers 54, the cover 56 may be rotated from its closed position to its open position, and the containers 54 may then be slid out of the openings 52.

As shown in FIG. 1, an outer surface 58 of the cart 12 may define one or more openings 60 leading to compartments 62. The compartments 62 may be adapted to store or dispose of newspapers, magazines, or other types of material. In such manner, the cart 12 may allow for the storage of different types of material in different compartments.

As seen in FIGS. 1 and 4, two tubes 64 and 66 may extend through basin 14. The bottom surfaces 68 of each of trash vessels 20 and 22 may be defined by a plurality of holes (not shown). The tear-off seals 50 at the bottom portions 44 of each of trash vessels 20 and 22 may cover the plurality of holes in each to prevent liquid from passing out of the vessels 20 and 22. A drain 70 may be disposed in a top surface 72' of the basin 14 which is adapted to abut against the bottom surface 68 of trash vessel 22. The drain 70 may be connected to tube 64. When tear-off seal 50 is removed from trash vessel 22, liquid within trash vessel 22 may flow through the plurality of holes (not shown) in the bottom surface 68 of trash vessel 22, through drain 70, and into tube 64. In such manner, liquid may be drained from trash vessel 22. The same type of drain 70, again connected to tube 64, may be disposed in another top surface of the basin 14 and may be adapted to abut against the bottom surface 68 of trash vessel 20. In such manner, liquid may also be removed from trash vessel 20 by removing the tear-off seal from trash vessel 20 thereby allowing liquid within trash vessel 20 to flow though the plurality of holes (not shown) in the bottom surface 68 of trash vessel 20, through drain 70, and into tube 64.

Figure 7:
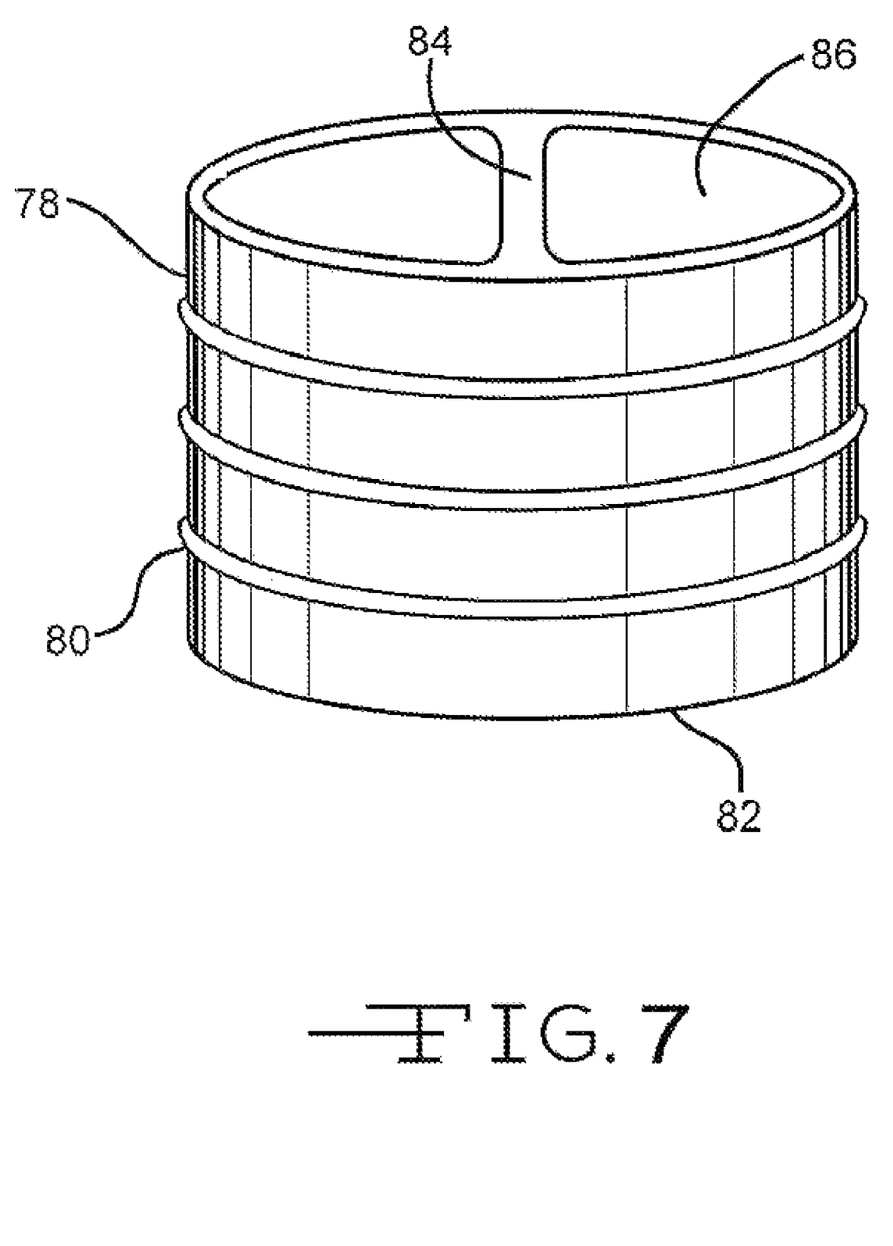
FIG. 7 depicts a perspective view of a piston adapted to be disposed within a trash vessel in the system of FIG. 1.

Tube 66 in basin 14 may be connected to tubes 71 and 73. Tubes 71 and 73 may extend up the wall surfaces 18 and into the top portions 72 of lids 32 and 34. The open ends 74 of tubes 71 and 73 may extend through openings 76 within the lids 32 and 34 so that the tubes 71 and 73 are connected to trash vessels 20 and 22. A separate piston 78, as shown in FIG. 7, may be retained within each of lids 32 and 34 shown in FIG. 1. Each of the two pistons 78 may comprise a substantially cylindrical surface 80 having a solid bottom surface 82, a handle 84, and a hollow interior 86.

After the mobile cart 12 is used to dispose of trash in trash vessels 20 and 22, the cart 12 may be docked at a docking station (not shown) within an aircraft. When docked, one or more portions of the cart 12 may be locked in place at the docking station to prevent the cart 12 from moving. Each of tubes 64 and 66 may be connected to separate valves (now shown) at the docking station. Each of the respective valves may have a closed position in which the valve is closed, a vent position in which the valve is connected to a vent source, and a vacuum position in which the valve is connected to a vacuum trash disposal.

After the cart 12 has been docked at the docking station and the tubes 64 and 66 have been connected to the separate valves, the valve connected to tube 64 may be put into the vacuum position, and the valve connected to tube 66 may be put into the vent position. When the valve connected to tube 64 is put into the vacuum position, tear-off seal 50 may be sucked off the bottom surfaces 68 of trash vessels 20 and 22 allowing air and liquid to be sucked out of the plurality of holes (not shown) in the bottom surfaces 68 of each of vessels 20 and 22, through drains 70, into tube 64 (also referred to as a passageway out of and into vessels 20 and 22), and out to the vacuum trash disposal. When the valve connected to tube 66 is put into the vent position, the pressure from the vent may be higher than the pressure within each of vessels 20 and 22. As a result, the combination of the higher vent pressure in tubes 66, 71, and 73 (also collectively referred to as a passageway out of and into vessels 20 and 22) and the vacuum pressure in tube 64 may force the pistons 78 stowed in each lid 32 and 34 to be pushed downwardly out of the lids 32 and 34 and into each of the respective vessels 20 and 22. In such manner, the downward movement of the pistons 78 within the vessels 20 and 22 may cause trash within vessels 20 and 22 to be compacted. During this compaction, liquid trash and small particle trash may be vacuumed out of the vessels 20 and 22 and into the vacuum trash disposal.

After compaction of the trash in vessels 20 and 22, the pistons 78 may be retracted up through the vessels 20 and 22 back into each of the respective lids 32 and 34 by putting the valve connected to tube 64 into the vent position, while putting the valve connected to tube 66 into the vacuum position. In such manner, the vacuum force exerted through tube 66 in combination with the higher pressure force exerted in tube 64 may force each of the pistons 78 to retract back into their respective lids 32 and 34. The mobile cart 12 may then be removed from the docking station and additional trash may then be put into each of trash vessels 20 and 22. After collecting more trash, the cart 12 may be re-docked to the docking station and the cycle may be repeated to compact more trash while vacuuming out liquid trash and small particle trash from each of trash vessels 20 and 22. In other embodiments, the trash management system 10 may be attached to additional systems, and may have further capabilities.

Figure 8:
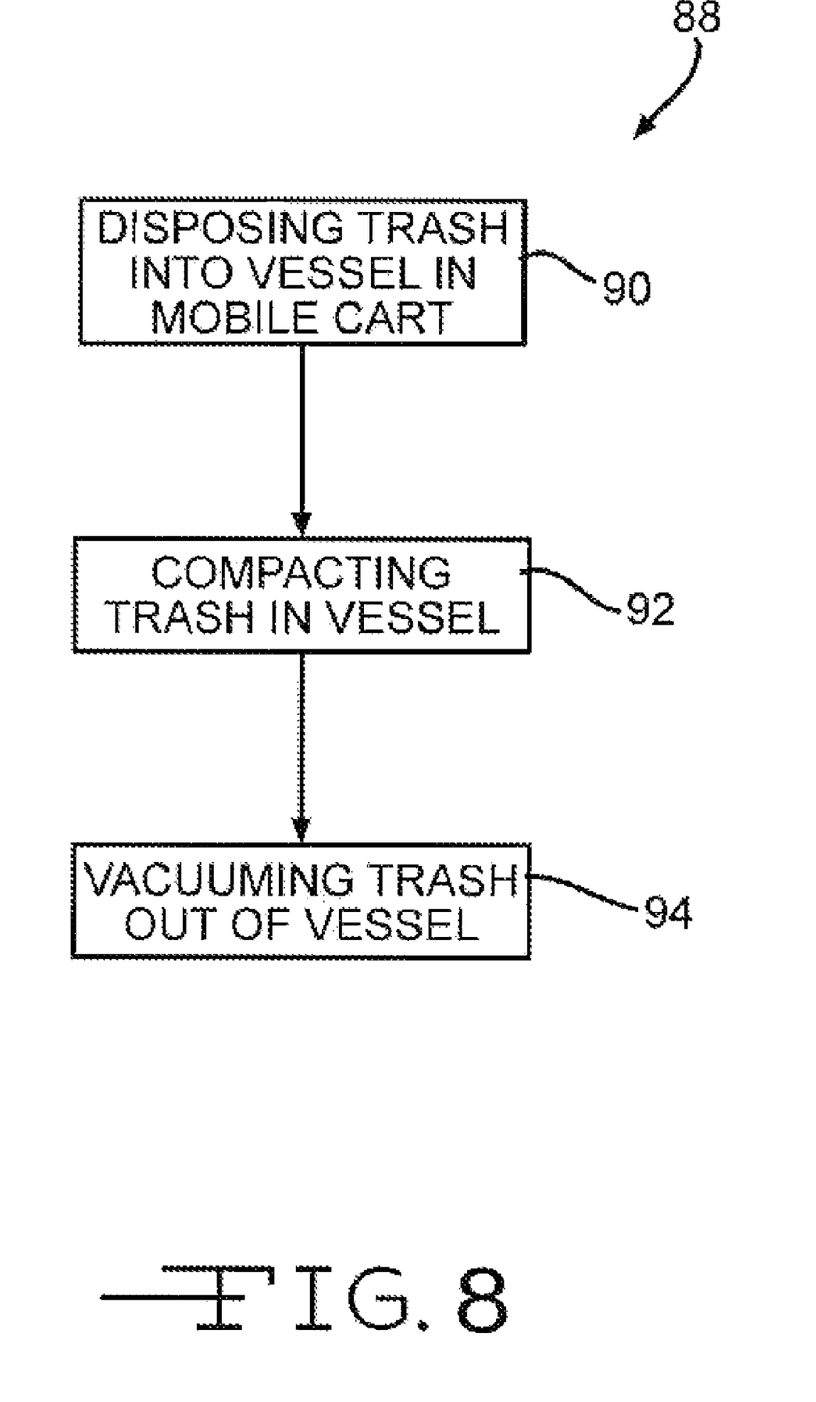
FIG. 8 contains a flowchart depicting one embodiment under the invention of a method of trash collection in an aircraft.

FIG. 8 depicts a method 88 of trash collection in an aircraft. In one step 90, trash may be disposed into one or more vessels in a mobile cart. During this step, recyclable trash may be disposed of into one vessel, and non-recyclable trash may be disposed of in a second vessel. The vessels may not contain trash bags. In another step 92, the trash may be compacted in the vessels. This step 92 may comprise moving one or more pistons from a first to a second position to compact the trash within the vessels. This may be achieved by controlling one or more valves in order to move the piston from the first position to the second position. After compaction of the trash, the valves may be controlled to move the piston from its second position back to its first position. In still another step 94, a portion of the trash may be vacuumed out of the vessels. The portion of the trash vacuumed out of the vessels may comprise liquid trash and/or dimensionally small trash. The steps 92 and 94, of compacting and vacuuming the trash, may be done simultaneously. Each of steps 92 and 94 may utilize a plurality of passageways which are each adapted to be connected to a vacuum trash disposal and to a vent source. In a further step, the vessels may be removed from the cart. In still another step, the cart may be docked at a docking station in the aircraft.

One or more embodiments of the disclosed invention may solve one or more problems in existing trash management systems or methods. One or more embodiments of the invention may allow a mobile trash collection system which may be adapted to dispose of trash into varying vessels, containers, and compartments depending on the type of trash. The mobile trash collection system may be adapted to compact and vacuum the trash out of one or more of the trash vessels. The trash collection system may make the process of disposing of trash less difficult, may allow for more trash to be collected, may make the trash collection process more efficient, and/or may save cost.

It should be understood, of course, that the foregoing relates to exemplary embodiments of the invention and that modifications may be made without departing from the spirit and scope of the invention as set forth in the following claims.

We claim:

1. An aircraft trash management system comprising:
   a mobile cart;
   at least one trash vessel connected to said mobile cart, wherein a bottom surface of said vessel contains one or more holes, and wherein said bottom surface of said vessel is covered by a removable tear-away seal;
   at least one piston moveable from a first position to a second position, and moveable from said second position back to said first position, wherein said piston is adapted to compact trash within said trash vessel; and
   at least one passageway connected to said trash vessel, wherein said passageway is adapted to be connected to a vacuum trash disposal.

2. The aircraft trash management system of claim 1 wherein said mobile cart contains a plurality of multi-directional wheels.

3. The aircraft trash management system of claim 1 wherein said at least one trash vessel is removable from said cart.

4. The aircraft trash management system of claim 3 wherein there are two trash vessels connected to said mobile cart, one of said vessels is adapted to hold recyclable trash and the other of said vessels is adapted to hold non-recyclable trash.

5. The aircraft trash management system of claim 1 wherein said cart further comprises at least one container which is adapted to hold one or more cups.

6. The aircraft trash management system of claim 1 wherein said cart further comprises at least one compartment which is adapted to hold at least one of newspapers and magazines.

7. The aircraft trash management system of claim 1 wherein said cart further comprises at least one moveable lid which is adapted to cover at least a portion of said at least one trash vessel.

8. The aircraft trash management system of claim 7 wherein said at least one piston in said first position is retained within said lid.

9. The aircraft trash management system of claim 1 wherein said at least one piston in said second position is disposed within said at least one trash vessel.

10. The aircraft trash management system of claim 1 wherein said at least one passageway is additionally adapted to be connected to a vent source.

11. The aircraft trash management system of claim 7 wherein said system includes two passageways and one of said passageways is connected to said moveable lid and the other of said passageways is connected to said vessel.

12. The aircraft trash management system of claim 11 wherein each of said passageways are adapted to be connected to said vacuum trash disposal and a vent source.

13. The aircraft trash management system of claim 1 wherein said at least one passageway is adapted, when said piston compacts trash within said vessel, to vacuum out of said vessel at least a portion of said compacted trash.

14. The aircraft trash management system of claim 13 wherein said portion of said compacted trash comprises at least one of a liquid and dimensionally small trash.

15. The aircraft trash management system of claim 1 wherein said at least one trash vessel does not contain a trash bag.

16. The aircraft trash management system of claim 1 wherein said cart is adapted to be fixedly docked to a docking station within said aircraft.

17. The aircraft trash management system of claim 10 wherein said at least one passageway is adapted to be controlled by at least one valve wherein said at least one valve is adapted to in one position force said at least one passageway to act as a vacuum and wherein said at least one valve is adapted to in another position force said at least one passageway to act as a vent.

18. The aircraft trash management system of claim 11 wherein said two passageways are adapted to be controlled by one or more valves which are adapted to control whether each of said passageways individually acts as one of a vacuum and a vent.

19. The aircraft trash management system of claim 18 wherein said at least one piston is moveable from said first position to said second position to compact trash when said lid passageway acts as a vent and said vessel passageway acts as a vacuum.

20. The aircraft trash management system of claim 18 wherein said at least one piston is moveable from said second position back to said first position to retract when said lid passageway acts as a vacuum and said vessel passageway acts as a vent.

21. A trash management system comprising:
   a mobile cart;
   at least one removable trash vessel connected to said mobile cart, wherein a bottom surface of said at least one removable trash vessel contains one or more holes, and wherein said bottom surface of said at least one removable trash vessel is covered by a removable tear-away seal;
   at least one piston moveable from a first position to a second position, and moveable from said second position back to said first position, wherein said piston is adapted to compact trash within said removable trash vessel;
   a first passageway connected to said trash vessel; and
   a second passageway, wherein each of said first and second passageways are adapted to be connected to a vacuum trash disposal and a vent source.

22. The trash management system of claim 21 wherein said trash management system is adapted to be used in an aircraft.

23. The trash management system of claim 21 wherein there are two removable trash vessels connected to said mobile cart, one of said removable trash vessels is adapted to hold recyclable trash and the other of said removable trash vessels adapted to hold non-recyclable trash.

24. The trash management system of claim 21 wherein said cart further comprises at least one moveable lid which is adapted to cover at least a portion of said at least one trash vessel.

25. The trash management system of claim 24 wherein said at least one piston in said first position is retained within said lid.

26. The trash management system of claim 21 wherein said at least one piston in said second position is disposed within said at least one trash vessel.

27. The trash management system of claim 24 wherein said second passageway is connected to said moveable lid.

28. The trash management system of claim 21 wherein said at least one removable trash vessel does not contain a trash bag.

29. The trash management system of claim 21 wherein said cart is adapted to be fixedly docked to a docking station within an aircraft.

* * * * *